United States Patent [19]

Becker

[11] 3,716,123
[45] Feb. 13, 1973

[54] APPARATUS FOR SORTING ELONGATED ARTICLES
[75] Inventor: Rudolf Becker, 8 Munich 13, Germany
[73] Assignee: Knorr-Bremse GmbH, Munich, Germany
[22] Filed: Sept. 1, 1970
[21] Appl. No.: 68,668

[30] Foreign Application Priority Data
Sept. 3, 1969 Germany..................P 19 44 675.4

[52] U.S. Cl. ..................193/40, 209/80, 221/157, 198/33 R
[51] Int. Cl. ..........................B65g 11/00, B23q 7/12
[58] Field of Search......221/157, 158, 159, 160, 161, 221/162; 193/40; 198/33; 209/80, 81, 82; 73/37

[56] References Cited
UNITED STATES PATENTS
2,651,412  9/1953  Aller ......................209/82

Primary Examiner—Evon C. Blunk
Assistant Examiner—H. S. Lane
Attorney—Edmund M. Jaskiewicz

[57] ABSTRACT

Elongated articles, such as stud bolts, are conveyed in endwise relationship along a chute to a point of use. A fixed stop is engageable by articles within the chute. A pair of spaced airjet detectors are longitudinally spaced in the bottom of the chute and positioned at predetermined distances from each other and from the stop. When an article engages the stop, at least one or none of the airjet detectors will be covered depending on the position of the article in the chute. The detectors are connected to a pneumatic signal circuit which generates signals in response to the position of an article with respect to the said detectors.

4 Claims, 3 Drawing Figures

INVENTOR
RUDOLF BECKER

*Edmund M Jaskiewicz*
ATTORNEY

APPARATUS FOR SORTING ELONGATED ARTICLES

The present invention relates to the sorting of elongated articles conveyed in a chute, more particularly, to such an apparatus employing airjet detectors in the chute to sense the position and external longitudinal dimensions of each article and to generate pneumatic signals in response thereto.

In many manufacturing operations different forms of elongated articles, such as stud bolts, are required. Such bolts are generally conveyed to the point of use by a conveyor chute or similar transporting arrangement. Such stud bolts or similar elongated articles are characterized by a cylindrical or polygonal central portion and end portions having reduced diameters with or without threads. The threaded portions in certain forms of stud bolts may be of different lengths. A particular manufacturing operation may require that the longer-threaded portions, or perhaps the shorter-threaded portions, of the stud bolts are to be used. It is therefore desired that the stud bolts be conveyed to the point of use with a particular threaded end being initially presented. Various forms of sensing and sorting apparatus have been devised to detect the position of such stud bolts as they are conveyed along a chute, and even to detect the external dimensions of the bolts so that longer or shorter bolts are rejected. However, such prior known sorting apparatus has not been generally successful since the sorting structure was extremely complicated and hence relatively expensive to construct. Because of the complicated and expensive nature of the sorting structure, in many manufacturing plants, the bolts were sorted manually.

It is therefore the principal object of the present invention to provide a novel and improved device for sorting elongated articles according to position and/or their external longitudinal dimensions.

It is another object of the present invention to provide an apparatus for sorting elongated articles which is relatively simple in structure, reliable in operation, and can be quickly and easily adjusted for sorting according to various standards.

According to one aspect of the present invention, there is disclosed an apparatus for sorting elongated articles, particularly those articles having a cylindrical or polygonal central portion and end portions of reduced diameters where the articles are to be fed in a predetermined position to a point of use. The apparatus may comprise a conveyer chute which has two airjet detectors longitudinally spaced along the chute and opening into the bottom thereof. A stationary stop is provided which is engageable with an article in the chute. The airjet detectors are positioned at predetermined distances with respect to each other and to the stationary stop. Means which may comprise a pneumatic signal circuit are connected to the airjet detectors for generating pneumatic signals in response to the position or external longitudinal dimensions of an article positioned against the stop and covering at least one or none of the detectors. The adjusting of the distances of the airjet detectors may be simply carried out by providing a slot in the bottom of the chute and displaceably mounting the airjet detectors within the slot.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views, a specific embodiment of the present invention will be described in detail.

Figure 1:
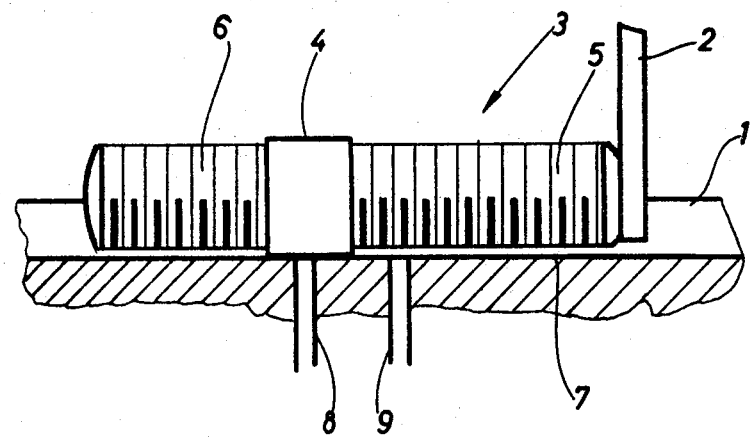
FIG. 1 is a side elevational view of a stud bolt which is to be sorted in the conveyor chute and positioned against a fixed stop with the bottom of the chute being shown in section.
Figure 2:
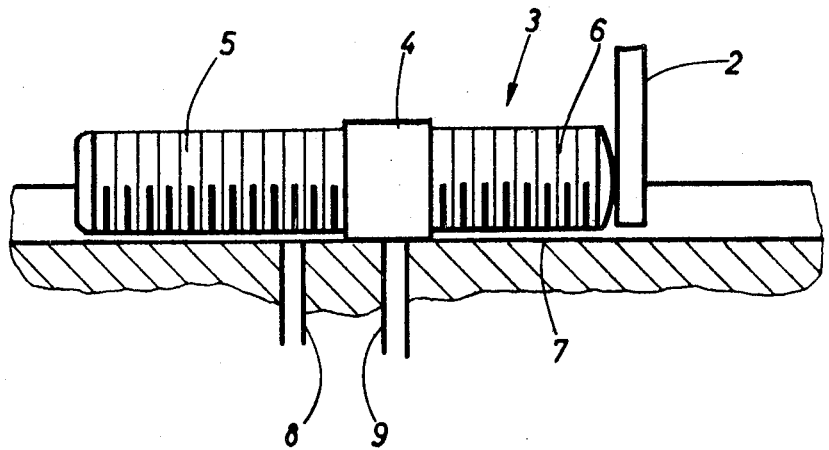
FIG. 2 is a view similar to that of FIG. 1 but shows the same stud bolt in a different position.

As may be seen in FIGS. 1 and 2, a chute 1 is provided for conveying the elongated articles to be sorted in end-to-end relationship to a point of use. A stationary stop 2 projects into the conveyor chute 1 so as to be engageable by a conveyed article. In the present embodiment of the invention, the article to be sorted comprises a stud bolt 3 having a cylindrical central portion 4 and threaded end portions 5 and 6 which are of reduced diameter with respect to the central portion and of different lengths. The cross section configuration of the chute 1 conforms to the central portion 4 of the stud bolt 3.

The bottom of the conveyor chute 1 is indicated at 7 and is provided with airjet detectors 8 and 9 which are positioned at certain predetermined distances with respect to each other and with respect to the stop 2. The chute 1 including its bottom 7 is so shaped with respect to the outline of the bolt central portion 4 and the bolt 3 is guided in the conveyor chute in such a manner that the bolt central portion 4 is capable of covering the opening of one of the two airjet detectors 8 and 9.

In FIG. 1, the stud bolt 3 has its longer end portion 5 abutting against the stop 2. In this position, the airjet detector 8 is covered by the central portion 4. In FIG. 2, the same stud bolt 3 has its shorter end portion 6 abutting against the stop 2 so that its central portion 4 now covers only the opening of airjet detector 9. The pneumatic signal circuit which is disclosed in FIG. 3 and which is to be presently described, has pneumatic logic elements connected to the airjet detectors so as to generate a pulse or signal corresponding to the position of stud bolt 3 as shown in FIG. 1 and 2. Corresponding signal pulses are also generated when no stud bolt is present in the conveyor chute or when both or none of the airjet detectors are covered by an article which may be a bolt of a different size is positioned in the shoot.

Figure 3:
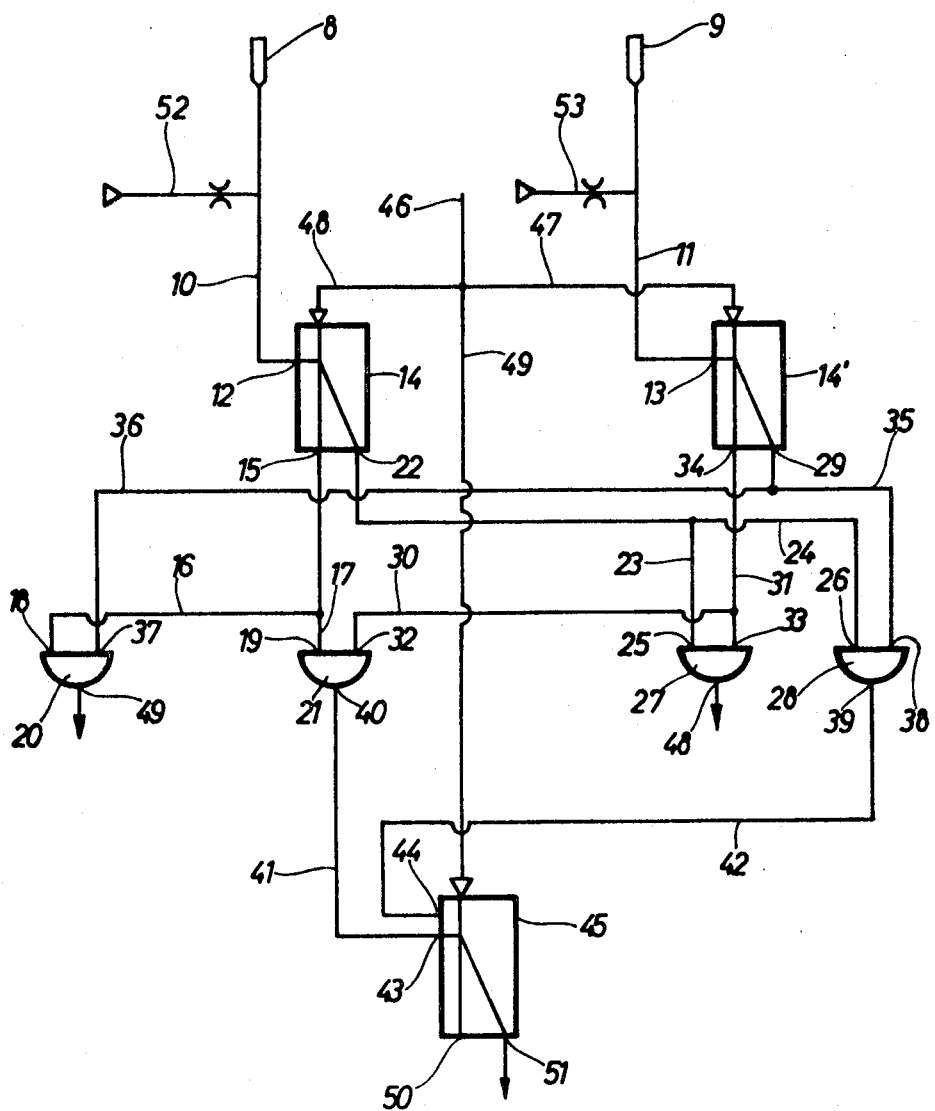
FIG. 3 is a circuit diagram of the pneumatic signal system employed in the invention disclosed herein.

The pneumatic signal circuit in FIG. 3 comprises lines 10 and 11 connecting airjet detectors 8 and 9 to control inputs 12 and 13 to the OR/NOR elements 14 and 14'. The OR/NOR element 14 has a stable output 15 which is connected through lines 16 and 17 to inputs 18 and 19 respectively of two AND elements 20 and 21. The other or unstable output 22 of the OR/NOR element 14 is connected by lines 23 and 24 to inputs 25 and 26 of two additional AND elements 27 and 28 respectively.

In a similar manner, the OR/NOR element 14' has a stable output 34 which is connected by lines 30 and 31 to inputs 32 and 33 of AND elements 21 and 27 respectively. The other or unstable output 29 of the OR/NOR element 14' is connected over lines 35 and 36 to inputs 37 and 38 respectively of the AND elements 20 and 28.

The AND elements 21 and 28 have outputs 40 and 39 respectively which are connected by lines 41 and 42 to parallel control inputs 43 and 44 of a further OR/NOR element 45. The OR/NOR elements 14, 14' and 45 are supplied with air under pressure from a supply line 46 having branches 47, 48, and 49, leading to the respective elements.

When both airjet detectors 8 and 9 are not covered, air will flow from the detectors over lines 10 and 11. In addition, air will flow from the outlets 15 and 34 of OR/NOR elements 14 and 14' over lines 17, 31 and 30 with these flows appearing simultaneously on the AND element 21. As a result, airflow will emerge at the output 40 of the AND element 21 and will be supplied over line 41 to the control input 43 of the OR/NOR element 45. In response, the OR/NOR element 45 will be switched from its stable position where air is discharged at an output 51. The discharge of air at output 51 may be used to generate a signal pulse which indicates the absence of an article to be sorted, or that none of the airjet detectors 8 and 9 are covered by the central portion of an article which may be in the sorting position against the stop 2.

When both airjet detectors 8 and 9 are covered, the OR/NOR elements 14 and 14' switch from their stable positions with air being discharged at outputs 15 and 34 into their unstable positions with airflow occurring at outputs 22 and 29. The elements 14 and 14' will remain in these positions only during that time that the corresponding airjet detectors are covered.

If only the airjet detector 8 is covered, simultaneous air pulses will appear at the inputs 25 and 33 of AND element 27. As a result, a pneumatic pulse will emerge at output 48 of the AND element 27 with this pulse indicating a stud bolt position as illustrated in FIG. 1.

Should only the airjet detector 9 be covered, simultaneous airflows will appear only at the inputs 18 and 37 of AND element 20 and will thus generate an output signal at an output 49 which signal indicates that a stud bolt is positioned as shown in FIG. 2.

If both airjet detectors 8 and 9 are covered simultaneously, the two OR/NOR elements 14 and 14' will be in their unstable positions as described above where air pulses will emerge at outputs 22 and 29. As a result, simultaneous air pulses will appear only at the two inputs 26 and 38 of AND element 28 and a pulse will be generated at output 39.

The air pulse from output 39 flows over line 42 to the control input 44 of the OR/NOR element 45 so that this element is switched to its unstable position where an output pulse is generated at output 51. Thus, the OR/NOR element 45 responds in the same manner as though an air pulse appeared at control input 43 because both airjet detectors 8 and 9 were not covered. The outputs 48 and 49 of the AND elements 27 and 20 as well as output 51 of the OR/NOR element 45 are connected in a known manner to pulse amplifiers for triggering known switching or indicating devices.

The airjet detectors 8 and 9 may be adjusted with respect to each other and with respect to the stop 2 by structures indicated schematically at 52 and 53. To accomodate this adjustability feature of the airjet detectors, the lines 10 and 11 may be flexible and comprise flexible tubing or the like.

Thus it can be seen that the present invention has disclosed a simple yet effective apparatus for sorting elongated articles such as stud bolts and the like wherein pneumatic signals are generated in response to the position and/or dimensions of the article being tested. Specific pneumatic signals are generated in response to the endwise positioning of the elongated article, in response to the absence of an article in the testing position, or the presence of an article whose dimensions do not conform to the existing test standards. The generated signals may be used to actuate known forms of apparatus for removing those elongated articles which do not conform to the standards. For example, if a stud bolt is improperly positioned, it can be removed from the conveyor chute. In the event a bolt of improper size or dimensions is conveyed in the chute, this bolt also can be removed by a mechanism actuated in response to the generated pneumatic signals. The sorting apparatus is not only suitable for use in sorting stud bolts but other elongated articles including bolts of various sizes and dimensions, fastner elements and structural components which may be conveyed along a chute.

It is understood that this invention is susceptible to modification in order to adapt it to the different usages and conditions, and, accordingly, it is desired to comprehend such modifications within the invention as may fall within the scope of the appended claims.

What is claimed is:

1. In an apparatus for sorting elongated articles having a cylindrical or polygonal central portion and threaded end portions of reduced diameter and unequal length where the articles are to be fed in a predetermined end position to a point of use, the combination of a chute receiving the articles in endwise relation, two airjet detectors longitudinally spaced along said chute and opening into the bottom thereof, a stop engageable by an article in said chute, said airjet detectors being positioned at predetermined distances with respect to each other and to said stop such that one detector senses the cylindrical portion of the article when properly positioned and the other detector sensing said cylindrical portion when improperly positioned and control means connected to said airjet detectors for releasing pneumatic signals in response to an article positioned against said stop, said improperly positioned article being ejected in response to said last mentioned sensing.

2. In an apparatus as claimed in claim 1, and comprising means for adjusting the distances of said detectors with respect to each other and to said stop.

3. In an apparatus as claimed in claim 2, wherein there is a slot in the bottom of said chute and said detectors are displaceable therein.

4. In an apparatus as claimed in claim 1, wherein said pneumatic signal means comprises first and second OR/NOR elements having control inputs respectively connected at all times to said airjet detectors, each of said OR/NOR elements having a stable and an unstable output, first and second AND elements having first inputs connected to the stable output of said first OR/NOR element, third and fourth AND elements having first inputs connected to the unstable output of said first OR/NOR element, said first and second AND elements having second inputs connected to the stable output of said second OR/NOR element, said third and fourth AND elements having second inputs connected to the unstable output of said second OR/NOR element, and a third OR/NOR element having first and second parallel control inputs connected to the outputs of said second and fourth AND elements.

* * * * *